United States Patent
Fay

(10) Patent No.: US 10,455,296 B2
(45) Date of Patent: Oct. 22, 2019

(54) INTELLIGENT TITLE CACHE SYSTEM

(71) Applicant: Todor Fay, La Jolla, CA (US)

(72) Inventor: Todor Fay, La Jolla, CA (US)

(73) Assignee: NEWBLUE, INC., San Diego, CA (US)

( * ) Notice: Subject to any disclaimer, the term of this patent is extended or adjusted under 35 U.S.C. 154(b) by 202 days.

(21) Appl. No.: 15/494,502

(22) Filed: Apr. 23, 2017

(65) Prior Publication Data

US 2018/0027283 A1 Jan. 25, 2018

Related U.S. Application Data

(63) Continuation-in-part of application No. 15/441,160, filed on Feb. 23, 2017, now Pat. No. 9,830,948, which is a continuation of application No. 15/216,397, filed on Jul. 21, 2016, now Pat. No. 9,620,173.

(51) Int. Cl.
*H04N 21/81* (2011.01)
*G11B 27/036* (2006.01)

(52) U.S. Cl.
CPC ....... *H04N 21/8126* (2013.01); *G11B 27/036* (2013.01)

(58) Field of Classification Search
None
See application file for complete search history.

(56) References Cited

U.S. PATENT DOCUMENTS

| | | | |
|---|---|---|---|
| 6,199,082 B1 | 3/2001 | Ferrel et al. | |
| 6,230,173 B1 | 5/2001 | Ferrel et al. | |
| 7,028,096 B1 | 4/2006 | Lee | |
| 7,225,264 B2 | 5/2007 | Croman et al. | |
| 8,645,991 B2 | 2/2014 | Mcintire et al. | |
| 2010/0262710 A1* | 10/2010 | Khatib | G11B 27/034 709/231 |
| 2015/0127636 A1 | 5/2015 | Hofstetter et al. | |
| 2016/0277781 A1* | 9/2016 | Lennon | H04N 21/2743 |

FOREIGN PATENT DOCUMENTS

WO WO2001022688 A1 3/2001

* cited by examiner

*Primary Examiner* — Heather R Jones
(74) *Attorney, Agent, or Firm* — Ronaldo G. Penaflor

(57) ABSTRACT

Embodiments of the invention relate to an intelligent title cache system and more particularly to an automated graphical system for replacing potentially lengthy graphics rendering from a wide range of graphics generating systems with very fast assembly of 2D pre-rendered images into a complete video frame. This ensures minimum latency and consistent, predictable processing overhead, regardless of how complicated the render itself may be. Moreover, the intelligent title cache system is configured to prepare the majority of cached images ahead of time for all frequently used values.

20 Claims, 14 Drawing Sheets

Finished composited Image
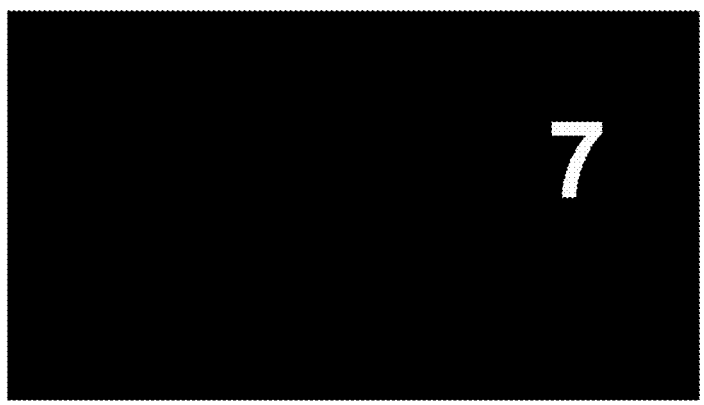
Variation for "_____7"
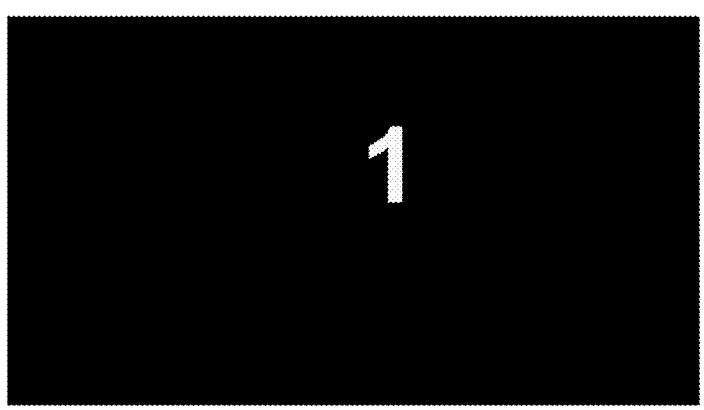
Variation for "___1___"
FIG. 12

INTELLIGENT TITLE CACHE SYSTEM

RELATED APPLICATIONS

This application claims the benefit of priority of U.S. application Ser. No. 15/441,160, filed Feb. 23, 2017, which is a continuation of application Ser. No. 15/216,397, filed Jul. 21, 2016, which are herein incorporated by reference to the present application.

FIELD OF THE INVENTION

The present invention relates generally to an intelligent title cache system and more particularly to a title cache system for replacing potentially lengthy graphics rendering with very fast assembly of 2D pre-rendered images into a complete video frame. This ensures minimum latency and consistent, predictable processing overheard, regardless of how complicated the render itself may be.

BACKGROUND

In the world of title and graphics animation as it applies to 3-Dimensional (3D) Real Time Rendering, the standard approach to rendering complex visual 3D models for real time playback, including real time data updates (for example sports scoreboards, stock tickers, weather, news, and all manner of live graphics used in broadcast production that are meant to display up to date information as it comes in) is to build hardware graphics systems that are powerful enough to accomplish converting data into graphics in real time. However, this always puts an upper limit of aesthetic complexity and necessitates very expensive hardware. Meanwhile, the dramatic rise in low cost computers with decent graphics ability and explosion of live streamed broadcasting necessitates the need for an affordable way to create responsive, yet aesthetically complex, animated graphics on a wide range of systems.

Similarly, in the world of title and graphics animation in 2-Dimensional (2D) Real Time Rendering applications, the standard approach for fast 2D rendering and drawing alphanumeric values or characters efficiently is to create images of each character and then position them at the appropriate position in the display output such as a monitor or television. For example, to display "00:00", the general method is to take the rendered "0" and draw it onto the display four times, each offset by the appropriate amount. This approach is very efficient, but can have several drawbacks such as 1) It may be very specific, requiring knowledge of everything necessary to position the letters, including kerning and other font information; 2) If the design intends to show different digits in different ways (for example, increasing the size and changing the shading of the leading digit), this information may become even more specific and complicated; and 3) It limits the render to only letters. However, depending on the design of the title and graphics template, it may be desirable to interpret the data value in an entirely different way.

What is highly desirable is a title and graphics animation production and playback mechanism which does not become involved in the specific details of the actual graphics rendering methodology used to create a particular result, but instead can be applied to many different graphics rendering engines with the intended goal of converting such systems, that rarely can render in real time, into fully responsive real time graphics systems. Such a system should have the power of the full 3D system as well as the speed and efficiency of the 2D display system. Additionally, what is needed is a rendering production mechanism that is completely removed from any creative aspects of the title and graphic design itself. Graphic designers should not be required to focus on the implementation and real time performance details of their designs. Conversely, implementers of the systems should not be required to understand and work around the requirements of the specific design and render technology.

SUMMARY

This invention defines a title caching mechanism for replacing potentially lengthy graphics rendering with very fast assembly of 2D pre-rendered images into a complete video frame. This mechanism may be implemented and performed using a software or firmware application. It offers this capability through a flexible but consistent mechanism that can easily be used by a wide range of applications with differing requirements. In particular, an objective in this document is to provide an intelligent title caching system which does not itself engage in the actual rendering process of text, graphics and animation, but when applied to a specific graphics rendering engine, manages the rendering of text and graphics in such a way as to achieve improved optimization, efficiency and speed enhancement of the overall title processing system.

In particular, in the intelligent title caching system a Title is composed of a template and a number of variables in the template and an Input may determine which variables are dynamic. In this system, dynamic variables are each rendered in their own layer. All other variables may be set once and rendered in a background layer. In addition, dynamic variables can play in sync with the rest of the title, or independently. In some instances, playback of the title may be from the start to a pause point, and then to the end. Similarly, dynamic variables may start, pause, and stop payback independently. Playback of a variable considers its relation to the pause point. For example, to change a visible value, the system is configured to play from pause to out, and then inserts a new value, playing from in to a pause point. To momentarily view the value, the system plays it from in to out, without stopping. In another instance, the Input can specify a set of expected values for a variable, so they can be precomputed and cached. When variables are not cached, the system may play back the request by managing the rendering of the missing variable from the rendering engine, waiting for the new value to render, and then playing it.

Benefits and Advantages of system include, for example, 1) data independent rendering; 2) highly efficient playback driven by intelligent understanding of the component data as well as knowledge that full 3D render of a scene is much more compute intensive than overlaying precomputed bitmaps; and 3) By offloading the 3D graphics engine, it is possible to run the system on a wide range of computers, from simple processors with onboard graphics software to powerful GPU systems.

BRIEF DESCRIPTION OF THE DRAWINGS

Various other objects, features and attendant advantages of the present disclosure will become fully appreciated as the same becomes better understood when considered in conjunction with the accompanying drawings, in which like reference characters designate the same or similar parts throughout the several views, and wherein:

FIG. 12 illustrates a display output of a constantly changing time value, where individual digits are pre-rendered alone, per the overall graphics design, and then composited in real time to create the complete text, according to an embodiment.

DETAILED DESCRIPTION

Figure 1:
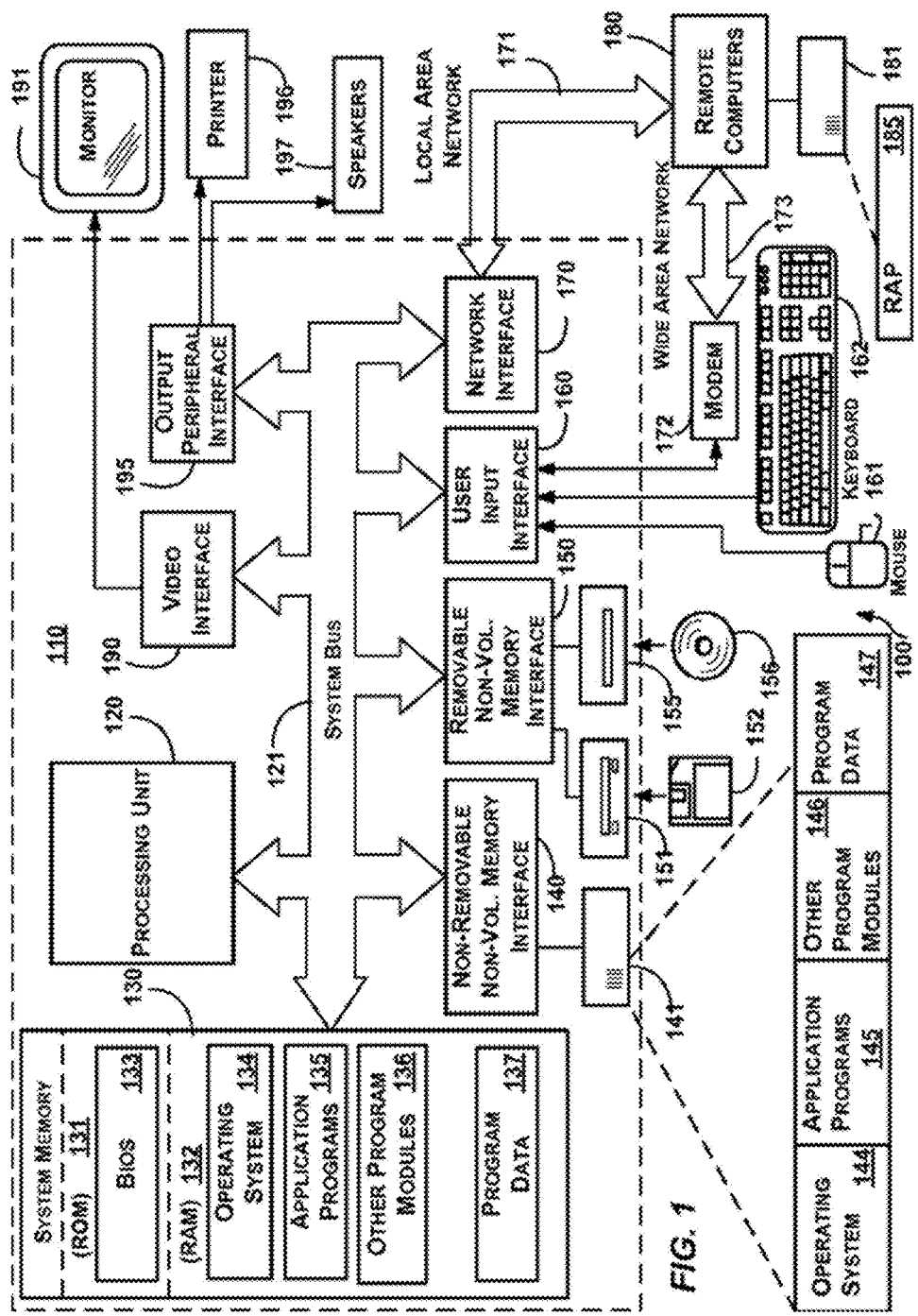
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

The computing environment 100 may include a system board 110 (alternatively known as the mainboard, motherboard, baseboard, planar board or logic board) which implemented on a printed circuit board (PCB). It provides communication between many of the electronic components of the system operating components, such as a central processing unit (CPU) and memory, and provides connectors for other peripherals. Hardware elements related to the system board 110 include, for example, memory components defined by a system memory using Read Only Memory ROM 131 and Random Access Memory RAM 132 circuitry, a central processing unit CPU 120 being defined by a microprocessing circuit, a system bus 121 having physical wiring bus elements to transfer binary data between each hardware components, and multiple external interfaces including a video interface 190, an output peripheral interface 195, non-removable and removable memory interfaces (140, 150), a user input interface 160, and a network interface 170. External hardware components of the system board 110 may include a display monitor 191, printer 196, speakers 197, keyboard 162, a pointing device or mouse 161, and a local area network 171 interfacing to remote computers 180. Software, programs data, and firmware may be applied to and installed on the system memories (131, 132) and provide instructions to operate the computing system 100. A BIOS 133 for providing a set of computer instructions in firmware that control input and output operations of the computer system 100 may be installed in the ROM 131. Applications related to software include an operating system OS 134, applications programs 135, other program software modules and drivers 136, and program data 137. Software may also be loaded and operated via storage devices such as hard drive 141, disk drive 151 via disk 152, and compact disk drive 155 via compact disk CD 156. The storage device may include and execute software such as an operating system 144, application programs 145, other program modules 146, and program data 147.

Aspects of the subject matter described herein are operational with numerous other general purpose or special purpose computing system environments or configurations.

Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants PDAs, gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The computing system environment 100 may also have or may execute a variety of operating systems OS, including an operating system used on a desktop platform or a mobile operating system used mobile devices such as smartphones, cellular/mobile phone, tablets, personal digital assistance PDA, laptop computer, smart watches, and the like. The computing system environment 100 may also include or may execute a variety of possible applications or "Apps", such as music streamers/players, e-book readers, utility Apps, and electronic gaming apps. The application may provide connectivity and communication with other devices or a server over a network, such as communicating with another computer via a wired or wireless Internet or Intranet network for online interaction such as electronic gaming or online collaboration.

Intelligent Title Cache System—Object Model

Figure 2:
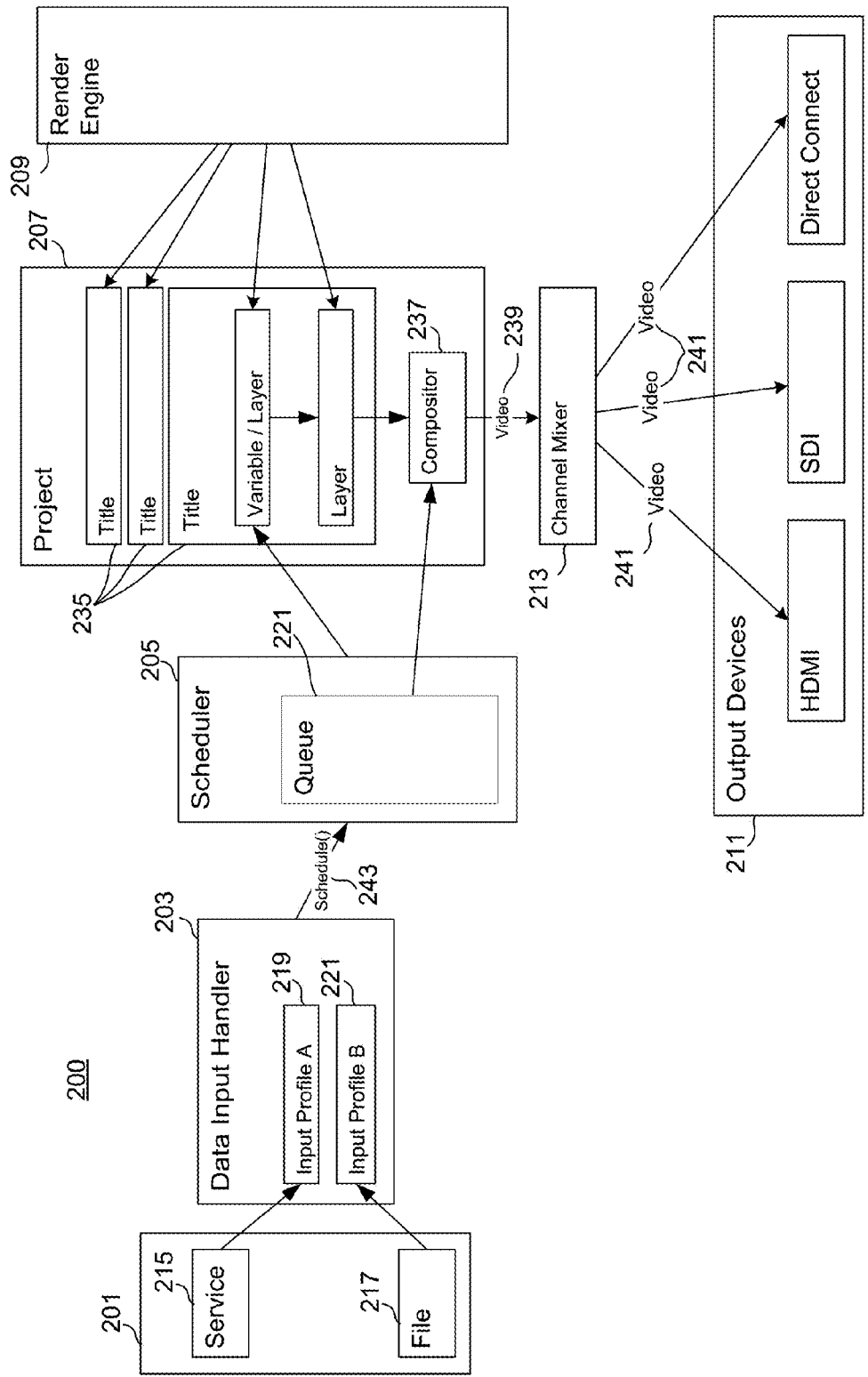
FIG. 2 illustrates a block diagram of an object model of an intelligent title cache system and related components thereof, according to an embodiment.

FIG. 2 illustrates a block diagram of an object model of an intelligent title cache system 200 and related components thereof, according to an embodiment. Components of the intelligent title cache system 200 may include 1) a data input source 201, 2) a data input handler 203 coupled to the media input 201 and configured to receive data therefrom, 3) a scheduler 205 coupled to an output of the data input handler 203, 4) a project component 207 coupled to an output of the of the scheduler 205 and an output of a render engine 209, and 5) a plurality of output devices 211 coupled to the project component 207 via a channel mixer 213. Each of the components (201-213) may include one or more subcomponents that are responsible for handling and processing data received by their corresponding components. For example, the data input 201 may include a service input 215 and one or more file inputs 217, the data inputs 203 may include a plurality of input profiles (219, 221), the scheduler 205 may include a queue 221, the project component 207 may include a plurality of title templates 235 and a compositor 237 subcomponent, and the plurality of output devices 211 may include multiple devices such as HDMI 225, SDI 227, and DirectConnect 229. Details and applications of components (201-211) and sub-components (213-241) contained within system 200 are further described in herein below.

1) Data Input Handler and Input Profiles

The input profiles (219, 221) of the data input handler 203 are also known as "Behaviors", and in some applications matching an input to a title may be considered important. For example, an input that sends the time of day may not be very useful when connected to a title that is designed to show the name of a contestant in a bike race. Thus, matching the input to the template is like matching the data to the display. The Input Profile (219, 221) provides a method for a data source to represent the variables that it manipulates, and in what methods, so it can then be matched to a title correctly and also perform efficiently in the overall rendering process, making sure that the data it is sending can be quickly turned into graphics which are displayed. For example, nothing much happens when a football scoreboard is connected to a weather reporting graphic. You want the data to be matched to the display. And, within that, you want the data which is going to change quickly and frequently to be capable of doing so, and that is where the caching mechanism excels, as will be further described in detail below.

In operation, each input profile (219, 221) is generally required to specify which variables it sends while the title template 235 specifies the variables to which it can respond. Thus, the first objective of the input profile is to match the behavior with a title that supports it. Next, the input profile is configured to provide some intelligence about how it intends to work with those variables, significantly impacting the real-time performance of system 200.

To illustrate this point in a sporting event application, take for example a scoreboard as a source for the data input 201, and consider four variables defined on the scoreboard: Home Score, Clock, Possession, and Home Team Name. In this scenario, The data input 203 expects to set the Score variable infrequently.

The data input 203 expects to set the Possession every now and then, but it knows that this will only be one of two values: Home or Opponent.

The data input 203 expects to set the Clock every tenth of a second. It knows that this too can be a predetermined set of values.

The data input 203 does not set the Home Team Name—that should be done before the game. It is unaware this variable exists.

In some instances, the input profile (219, 221) may handle each of the items above as follows:

The input profile defines the score variable as one that will change dynamically. Each time the score changes, a new score must be rendered and composited onto the rest of the image.

For the Possession variable, it provides two image choices, one for each direction.

For the Clock, it breaks down the string into sets for each digit. So, a 4-digit clock might have 10 states for each digit.

It completely ignores the Home Team Name. This should be set once and rendered into the background of the title.

Note that all variables, whether dynamic or preset, have timelines, so each of these examples involves a timeline of the text or image first entering and then exiting. These timelines may vary from variable to variable. Moreover, the input profile (219, 221) may denote which variables are required to be in the title template and which are optional.

In summary, the input profile (219, 221) may define a short set of information that the data inputs 203 provides to accomplish the following:

Describe a particular purpose, or behavior.

Find and match with appropriate title templates 235.

For performance optimization, identify which variables it will be changing, and where appropriate, what all the values are required to be.

Conversely, report back to the host (e.g., a data input service, application, device, etc.) which variables are expected to be manipulated.

2) Scheduler

In system 200, the scheduler 205 is generally responsible for managing the entire system of playback, and all commands route through it. Some of these commands include, for example, actions to load projects, assign variables, and trigger playback. Internally, the scheduler 205 maintains a set of queues 221, to help sequence commands to the title templates 235.

3) Render Engine

The Render Engine 209 of system 200 is generally responsible for performing all 2D or 3D rendering and animation in the system 200, being the key tool for creating the animated imagery in this titling technology. It may take as input a title template, with its variables assigned, and generates an output series of frames such as, for example, the rendered title. However, it can also be instructed to render only specific layers in other applications. Examples of the Render Engine 209 may include software based render engines or hardware based graphics and animation render engines and APIs, such as Unity, Direct3D and OpenGL.

4) Compositor

The compositor 237 takes one or more frame outputs from the Render Engine 209 and blends together various title templates 235 to make a finished frame or video output 239 as shown in FIG. 2. The compositor replicates the various blending modes available in the Render Engine, for combining multiple layers into one. These include standard techniques, such as Alpha Blend, Stencil Blend, and more. In some practical applications, techniques that the render engine might use to combine two layers are replicated by the compositor 237. In other words, the compositor 237 may be used to replicate what the render engine uses, which primarily may be an alpha blend, for example. However, with most graphic and animation tools, there may be some exotic blending modes, for example "screen", "color burn", etc., in which each blending mode is a different formula for how to combine two pixels from two image layers into one. And so, for each blending mode that the render engine uses, the compositor provides an equivalent implementation.

5) Channel Mixer

The video output 239 from the compositor 237 is received by the channel mixer 213 which combines the video output 239 from multiple title templates 235 on the same channel into one and then sends one or more combined video outputs 241 for that channel to the output devices 211. In practice, the system 200 may implement a variety of channel mixers, including software based mixers and hardware based mixers such as, for example, for combining the layers of images from all the titles into a single one. In one implementation, the channel mixer 213 may simply be an alpha blend composite.

6) Variables and Rendering

Referring again to FIG. 2, the title templates 235 are organized to optimize for rendering just what needs to change, and it does this in a way that reflects the fact that it is the variables that drive these decisions.

The rendered title itself may be separated into three types of layers:

Variables that have predefined values and typically change frequently. These can be rendered once, saved to cache, and used multiple times.

Variables that always receive new values. These are rendered as required and then discarded, or, if desired, kept and stored for later use.

Everything else. These are all the variables that don't change and all the background graphics, etc.

This determination of the layers is made by matching the input profile (219, 221) with the title template 235.

The title template templates 235 list all the variables it supports, as well as when they occur and where they are in the layer organization of the title templates 235 (including compositing information so they can be rendered in afterwards.)

The input profile (219, 221) lists which variables it will manipulate and, when applicable, all preset values the variable can take.

In operation, the scheduler 205 and title 235 use this information to orchestrate the performance intelligently and efficiently.

7) Schedule( ) Command:

In system 200, a Schedule( ) command 243 essential to runtime operation for triggering and controlling the flow animation and graphic events in system 200. The Schedule ( ) command 243 may be organized around variables, since variables determine what particular information are required to be updated. For example, by running multiple Schedule ( ) commands 243 for different variables on one title template 235, the different variables may independently update, even animating asynchronously within one title template 235. Conversely, the same variable across multiple title templates 235 can be scheduled to play synchronously with one call.

The Schedule( ) command 243 may take several parameters, including, for example:

a) Which title(s) to send it to. The address can be:
   The name of a specific title. ("title" field)
   The id of a specific title. ("title" field)
   The name of an input behavior or input profile. All titles that were set to this will receive it. ("input" field)
   The name of the variable(s). All titles that use these variables will receive it. (the "variable" field itself)

b) A set of variables and accompanying values. This can be empty or any number of variables to set all at once.

c) Markers, indicating optional start and end points within the title for the operation
   These refer to the named markers that are embedded in the templates, e.g., "Start" and "Pause".
   They can also be discrete time values, measured in seconds, e.g., "0.23"

d) An Action command, indicating action to take, including modifiers.

e) A time value. This is used to set the time this will occur. It can be modified by the Action.

A named queue (optional): Queues may organize actions to play in an order sequence and can have customized names. The queue may exist as long as there are Actions placed in it, and then eventually discarded.

The Action command defined within the Schedule( ) command 243 may be composed of multiple options and modifiers which are summarized and provided in Table 1 below:

TABLE 1

| | |
|---|---|
| "SetVars" | // Set these variables. |
| "Play" | // Play it. |
| "All" | // Use all layers. |
| "PlayOn" | // Make this a fresh playback of this title. |
| "PlayOff" | // Make this finish the playback of this title. |
| "Curate" | // Require this to be blessed by the user first. |
| "Loop" | // Play the selected layers with a continuous loop. |
| "Overlap" | // When updating a value, let the animations in and out overlap. |
| "Render" | // If variables change, force a render, even for the background. |
| // Region to play. By default it uses the two named In and Out markers. These options override them. | |
| "SetInVar" | // Set the in marker at the start of the earliest variable in the list. |
| "SetOutVar" | // End at the time of the last variable in the list. |
| "SetInPause" | // Start at the pause point in the middle of the template. |
| "SetOutPause" | // End at the pause point in the middle of the template. |
| "SetInTemplate" | // Start at the start of the template. |
| "SetOutTemplate" | // End at the end of the template. |
| "SetOutEmpty" | // End when the paragraph runs out of image. |
| // Timing. These determine when this starts playback, and options for its behavior. | |

TABLE 1-continued

| | |
|---|---|
| "Override" | // Clear out the queue and put this at the head. |
| "Replace" | // If there is an earlier queued item for this action, replace it. |
| "Interrupt" | // Kill the currently playing title as soon as this can start. |
| "Sync" | // Make sure all layers are finished playing before starting. |
| "First" | // Put this at the head of the queue. |
| "LockEnd" | // Lock the end times of all layers with the time. |
| "Render_Wait" | // If still rendering, force a wait. |
| "Render_Skip" | // If still rendering, play the paused still frame. |
| "Render_PickUp" | // If currently playing, just jump in at this point with updated value. |
| "Hold" | // Wait until previous play in queue is completed, then wait fTime. |
| "Time" | // Cue to play at the specified absolute time. |
| "Now" | // Play immediately, or delayed by fTime amount. |
| "Duration" | // Make the playback last exactly the value in the duration variable. |
| // Combine the above for some useful preset Actions: | |
| "Alert" | // Alert means play the title from start to finish. |
| "CutIn" | // Cut In means start playback in the middle and hold there. |
| "CutOut " | // Cut Out means stop immediately. |
| "AnimateIn" | // Animate In means start at the beginning and play up to the hold point. This is standard to bring in an overlay. |
| "AnimateOut" | // Animate Out means start at the hold point and play through the end. |
| | // Also, make sure all playing variables finish first. |
| | // This is standard to conclude an overlay. |
| "Update" | // Refreshes the selected variable(s) at the hold point, with animation. |
| "Prep" | // Get the template ready to play, but don't actually do anything. |
| "TightLoop" | // Loop the specified var(s) with no delay between loops. |
| "IntervalLoop" | // Loop the specified vars(s), delay set by the entire template. |
| "Crawl" | // Plays the specified vars until they have no letters left. |
| "Play_Once" | // Plays the selected variables from start to finish. |

Figure 3:
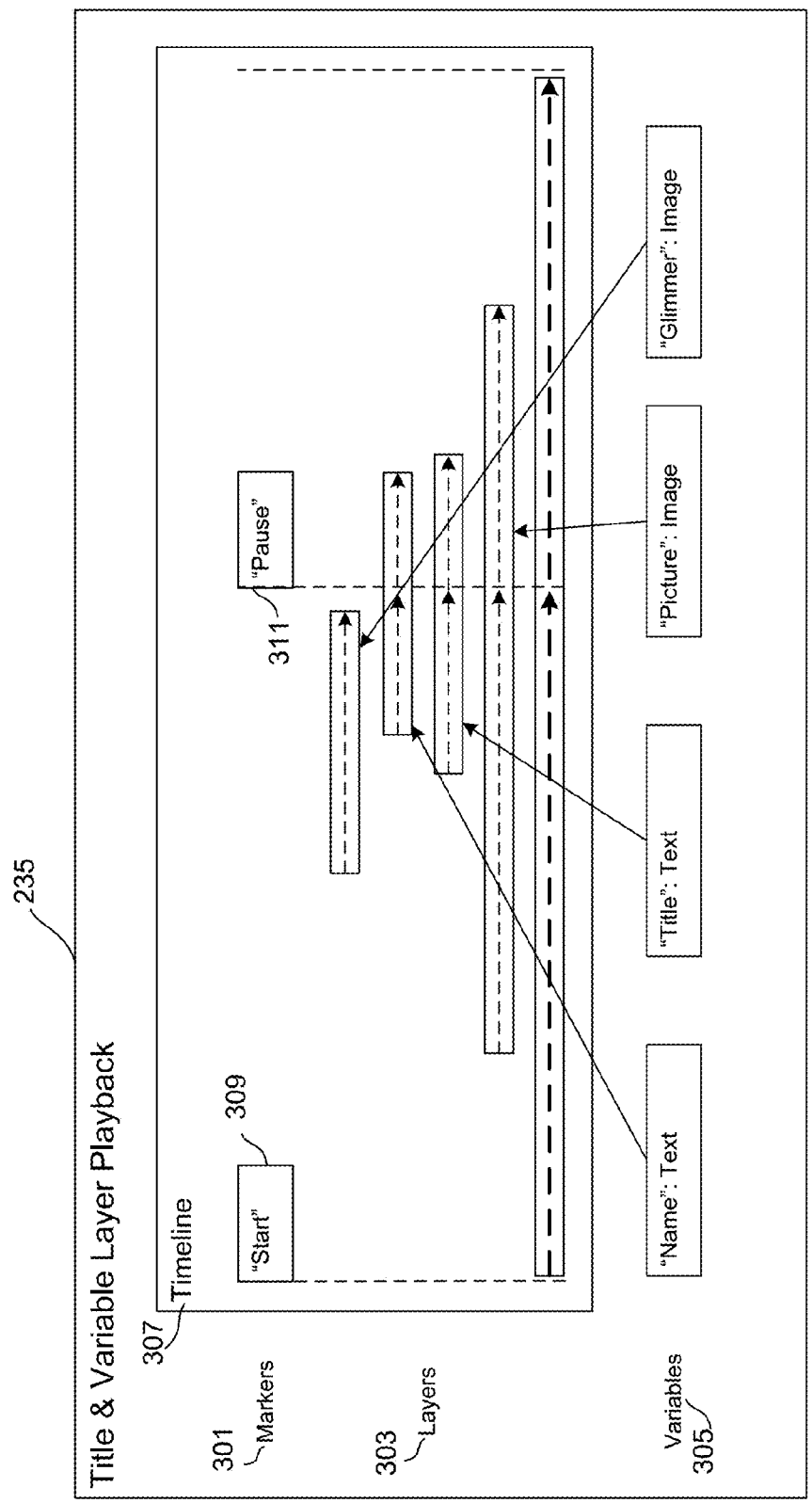
FIG. 3 illustrates a time-based illustration of the title template of the title cache system, according to an embodiment.

FIG. 3 illustrates a time-based illustration of the title template 235 of system 200. Each title template 235 may be characterized as a graphics generating document having three primary components: Markers 301, Layers 303, and Variables 305 contained within a timeline 307. Markers 301 may denote specific points in the title timeline 307. These are generally used to control the playback to known points on the timeline 307. For example, a "Start" marker 309 may indicate the beginning of the start sequence, usually used to "fly" the title in while a "Pause" marker 311 may indicate the point half way through where the display should hold for a while, and so it also marks the start of the final sequence that usually flies the title back out. In some applications, the "Pause" marker may be important because may be attributed to how individual layers are designed to update with new information. Layers 303 are defined in this document as individual graphic sequences that overlay each other, top to bottom, and animate over time. They can be any kind of imagery, from solids to pictures to text, for example. Individual layers can asynchronously play on their own timelines. However, they may all share the same pause point, which represents the moment when everything is displayed such that it can hold still for a while.

Variables 305 are defined in this document as receptacles for data that is displayed in the layers 303. Variables 305 manage images, text, even colors. Of these, the most frequently used are text variables, which may provide text to place in a layer. In all cases, variables 305 are communicated purely as text strings. The cache system 200 generally does not understand, and is not required to know, anything about the data in a variable 305 other than that it is represented with a text string. For example, a title template 235 may be designed to represent the string "01" with two numeric letters, or it might display the image of a goose head on a spring. The point here is that all the communication occurs as text strings, whether they are floating point numbers, RGB color definitions, file addresses of images, or the words "true" and "you lied".

Intelligent Title Cache System—Scheduling API

Figure 4:
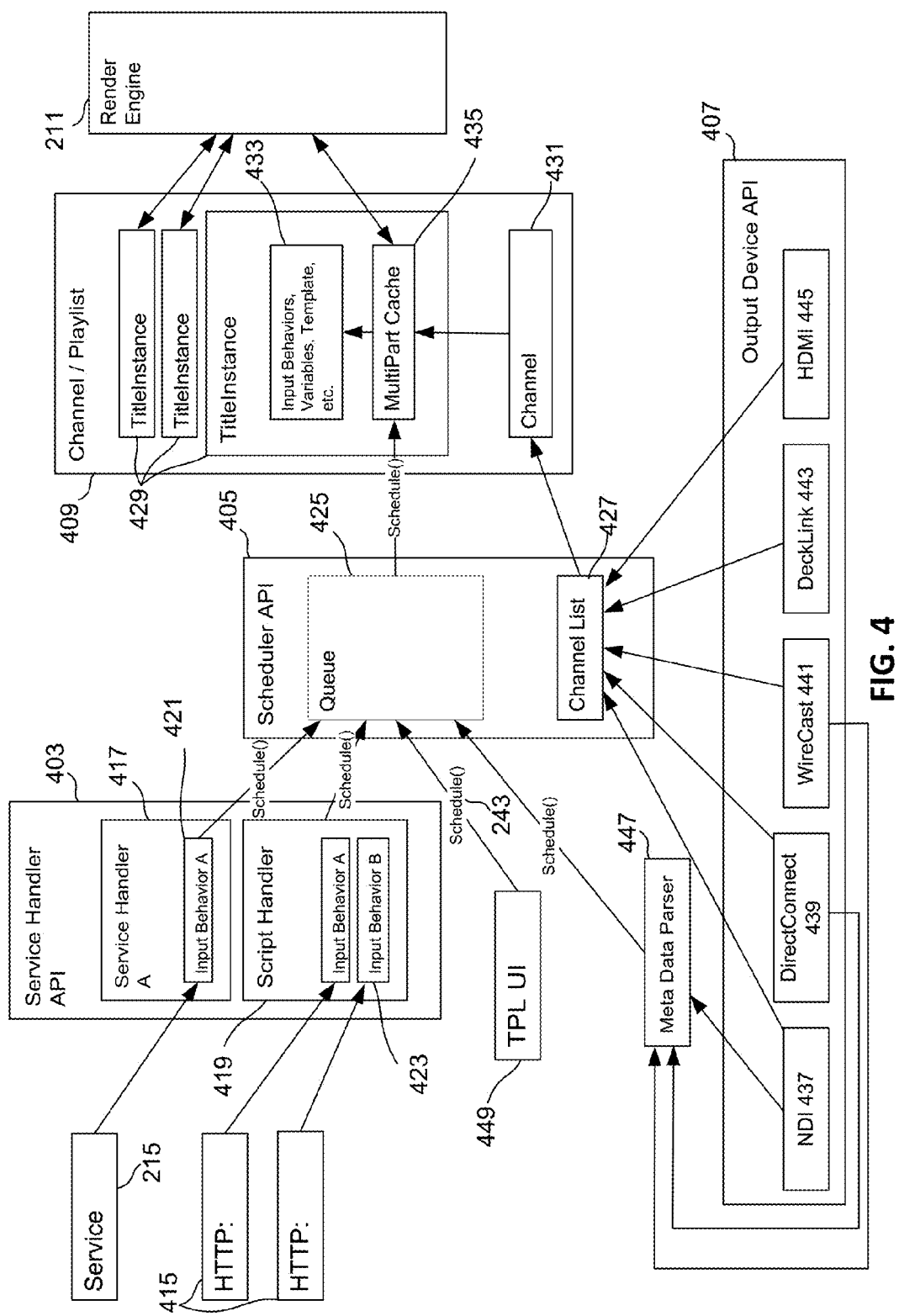
FIG. 4 illustrates a block diagram of a scheduling Application Program Interface representation of the intelligent title cache system, according to an embodiment.

FIG. 4 illustrates a block diagram of a scheduling Application Program Interface (API) representation of the intelligent title cache system 200. The API representation provides an enhanced view of several API elements (403-409) driving the components (201-213), including the operational interactions between these components and subcomponents of the intelligent title cache system 200. These API elements (403-409) may include, for example, a Service Handler API 403, a Scheduler API 405, and an Output Device API 407 for driving the data input handler 203, the Scheduler 205, a Channel/Playlist 409, and the Output Device 211 in system 200, respectively. In some other embodiments, other components and subcomponents may be included in system 200 such as, for example, one or more HTTP Input data 415 components, a Service Handler 417 subcomponent and a Script Handler 419 subcomponent associated with the Service Handler API 403, one or more Input Behavior 421 subcomponents associated with the Service Handler 417 subcomponent, one or more Input Behavior 423 subcomponents associated with the Script Handler 419, a Queue 425 and a Channel List 427 associated with the Scheduler API 405, one or more TitleInstances 429 and a Channel 431 subcomponent associated with the Channel/Playlist 409, a template 433 and a Multipart Cache 435 associated with the TitleInstances 429, multiple output devices NDI 437, DirectConnect 439, WireCast 441, DeckLink 443, and HDMI 445 associated with the Output Device API 407, a Meta Data Parser 447 component, and a title software user interface TPL UI 449 component.

TitleCache Class

A TitleCache class of the system 200 may optimize playback by determining which components of the title animation can be pre-rendered and which need to be prepared dynamically or "on the fly". This is all determined by which variables are in use in the template and how they are used.

Variables within a template fall into three categories:
Fixed. These are variables that are set once by the user in set up and then they are never changed during playback. These include variables that set information that is fixed and unchanged during a broadcast. Examples would be "Home Team" or "Background Color"

Predefined. These are variables that will change during the broadcast, but they will only pick from a predefined set of states. Examples might include "Inning", "Strikes", or "Countdown Clock".

Dynamic. These are variables that change during broadcast and can take on an unlimited range of values.

Knowledge of whether a title variable is Fixed, Predefined, or Dynamic is determined by two things:

The Template itself, which simply defines all of the available variables.

The Input, which specifies:
  Which variables it uses.
  Which variables are pre-defined.
  For predefined variables, all the different values.

Once the TitleCache class knows the behavior of each variable, it can construct a much more intelligent representation of the title in memory, breaking the representation down into one or more layers, which follow these rules:

One or more fixed layers, including the background layer, that span the full length of the title and includes:
  All fixed imagery within the title.
  All imagery that is driven by fixed variables.
  Fixed imagery that may appear in front of some of the titles (and so must be a separate fixed layer from the background fixed layer.)

For each predefined variable, a layer is created that manages all predefined variations of that variable. These renderings span the duration of the variable and typically have transparency so they easily composite on top of other layers, including the background layer.

For each dynamic variable, a layer is created, but no renderings attached until it is given a value.

Prior to playback, the background and predefined variable layers are completely pre-rendered, and their frames are made available as a frame cache, either in memory or in a file. The frame cache may be implemented both in memory as a memory frame cache or disk such as a file frame cache.

In a project work environment, this same cache can be saved to disk and then reloaded when the project is reopened. This cache gets completely regenerated if anything that changes the background layer or the predefined variables occurs. For example, conditions for regenerating the cache may occur when:
  the template is edited or replaced with a different one.
  sizing or positioning of the template is changed.
  any fixed variables are changed.
  the input definition for predefined variables changes (i.e., input changes.)

However, these are infrequent events and likely do not occur during a broadcast. During playback, dynamic variables respond to variable changes from external sources.

CCacheLayer, CCacheValue, CCacheSubFrame

A CCachelayer object represents one layer in the rendering of a title. Typically, this represents a variable that can change dynamically.

The rest of the template, including the design time variables, may all be handled by one or more CCachelayers that have no variables. These fixed layers include, for example, the "background" layer as well as any fixed semi-transparent layers that may appear before some other layers.

Multistate variables and Regular variables are two types of variables having the following attributes:

Regular variables get generated once and are used typically just once. They include most information that gets displayed on templates and are changed frequently, like Name, Message, Score, etc.

Multistate variables typically go back and forth between a fixed set of values, and they do it often. Two examples would be a clock and a display of strikes in baseball.

With all this in mind, we have three kinds of CCacheLayers, and rules for their behavior:

Multistate variable layer. This has two or more Values that represent each variation of the variable and they all get rendered up front and saved to frame cache, so they can be used again.

Regular variable layer. This has exactly one Value and gets re-rendered when the variable changes. These are rarely saved to the disk cache, because they won't last long.

Fixed/Background layers. These have all the steady state variables, none of which it needs to track. These are re-rendered whenever any of their variables change (which should be infrequently) and always saved to file frame cache.

Figure 5:
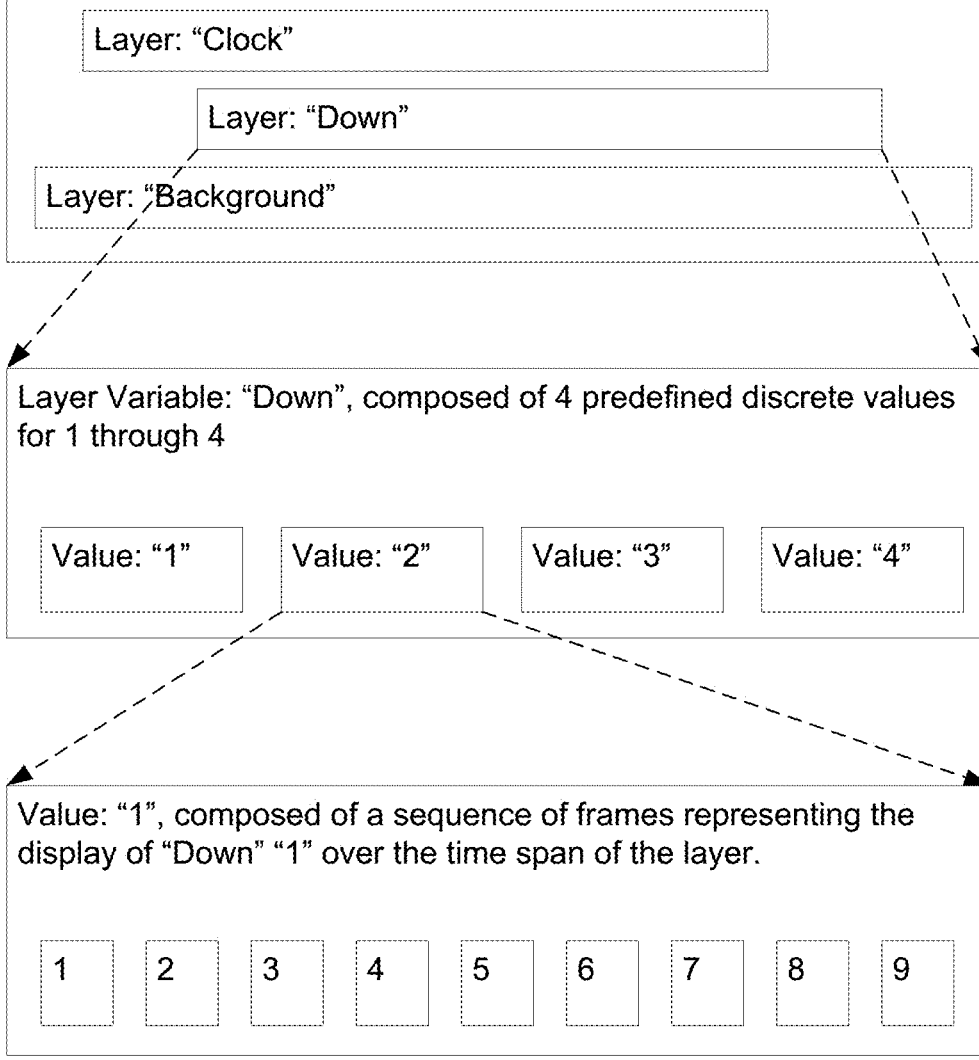
FIG. 5 illustrates a block diagram of an example of a Multistate Variable applied to a sporting event scenario, according to an embodiment.

FIG. 5 illustrates a Multistate Variable example 500 applied to a sporting event scenario. In FIG. 5, a Title Cache includes multiple layers ("Clock", "Down", and "Background"). The Multistate Variable "Down", for example, may be composed of four predefined values for the numbers 1 through 4. Value "1" may be composed of a sequence of frames representing the display of "Down" "1" over the time span of the layer.

CCacheValue

The CCacheValue keeps track of one value for a variable, managed by CCachelayer. Each CCacheValue carries all the information used to generate it and, of course, the resulting set of partial frames, in the form of an array of CCacheSubFrame objects.

CCachelayer creates a set of one or more CCacheValues to represent each possible variable value.

CCacheSubFrame

CCacheSubFrame represents one point in time in a full CCacheValue sequence. It manages the storage of this frame either in memory or to disk. Note that this frame is typically just a subset of the full frame at a specific point in time.

This provides methods to write a frame as well as read it.

It also manages compression of the frame itself. It does so with several mechanisms, all of which must respond in real time such as, for example, a "Region of Interest" (ROI): Store only the rectangle within the frame that is in use;

Data Compression: Fast lossless compression algorithms tend to be efficient with graphics imagery because of the prevalence of repeated pixel sequences; and a Frame Duplication: Often, layers don't have any changes over a period of frames, and so one value can be stored for all identical frames.

Figure 6:
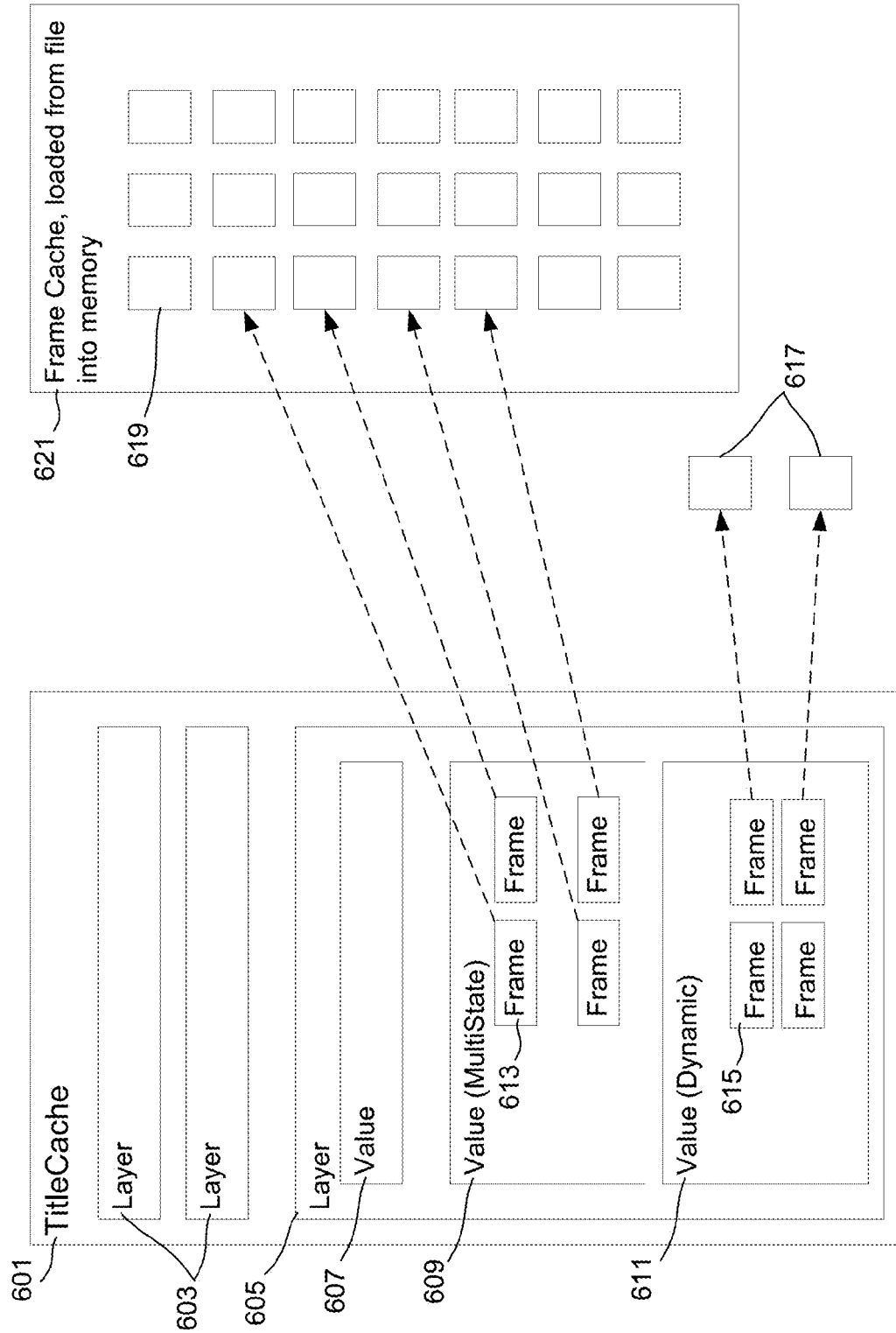
FIG. 6 illustrates a block diagram of an object representation of the TitleCache, according to an embodiment.

FIG. 6 illustrates a block diagram of an object representation of the TitleCache class named TitleCache 601, according to an embodiment. The TitleCache 601 in this illustration includes multiple layers (603, 605, 607). Layers 603 and 605 with no variables are defined here as a background while layer 607 includes multiple variables defined therein. Some of these variables include, for example, fixed 607, multistate 609 and dynamic 611 variables. The multistate 609 variable, in this example, may have multiple values 613 that represent each variation of the variable which all are rendered up front and stored to corresponding cells 619 within a frame cache 621, so they may be replayed at a later time. In practice, the dynamic variable 611 generates frames that may be stored in memory 617, but not stored back to disk for later use, as part of the rest of the frame cache.

Integration of the TitleCache Class

Figure 7:
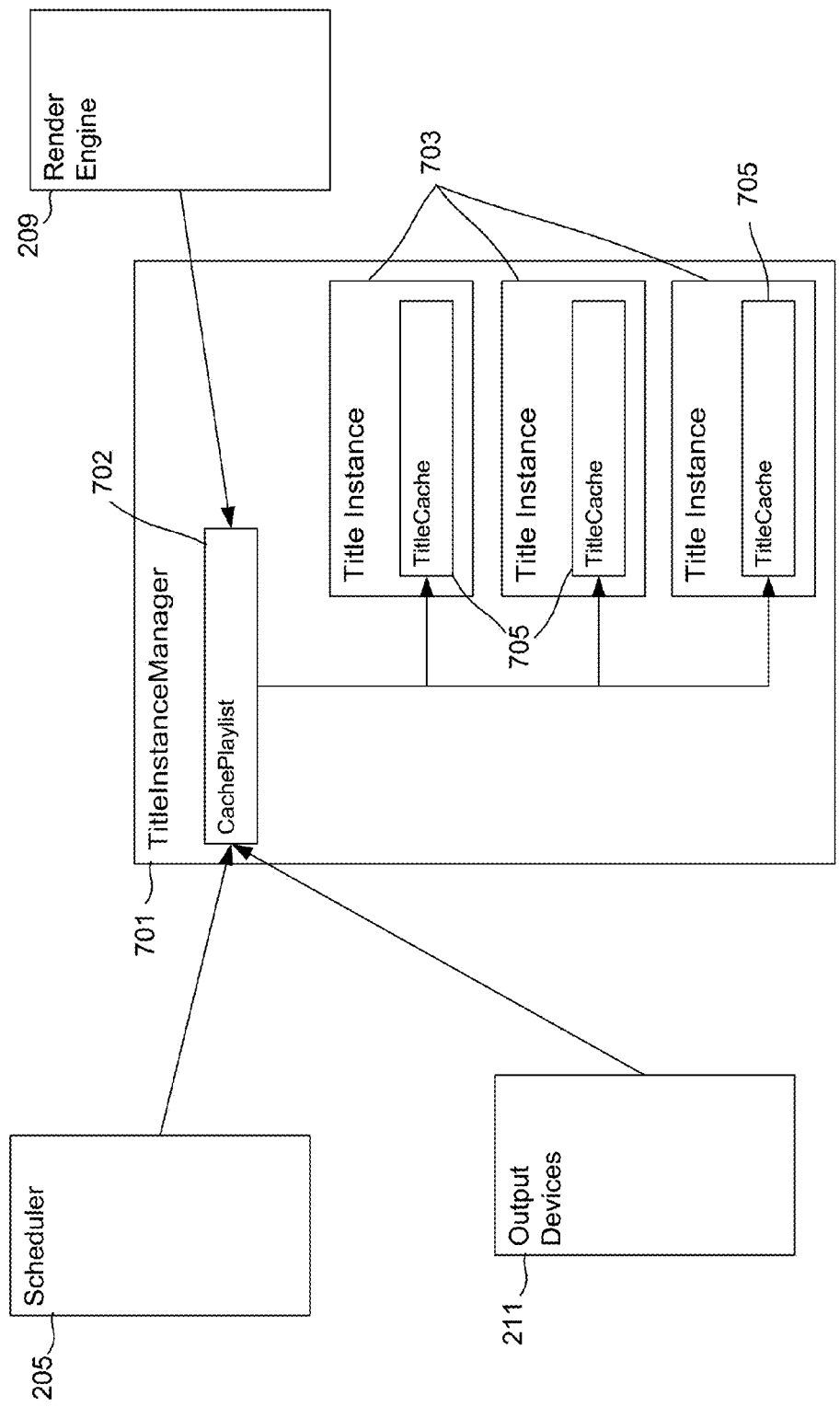
FIG. 7 illustrates a block diagram of the integration and implementation of the TitleCache class in the title cache system, according to an embodiment.

FIG. 7 illustrates a block diagram of the integration and implementation of the TitleCache class in system 200, according to an embodiment. The TitleCache class, in this example, may handle multipart rendering, caching, and playback of one specific title. It does it primarily under the control of the Scheduler 205 and seamlessly operates with the Render Engine 209, the Scheduler 205, the Output 211, and multiple Title Instances 703 defined within a Title Cache object called TitleInstanceManager 701.

Title Instance:

In FIG. 7, when the title instance is loaded, or created, it instantiates a Title Cache object called TitleCache 705, for example, to manage the rendering and caching of the title.

Figure 8:
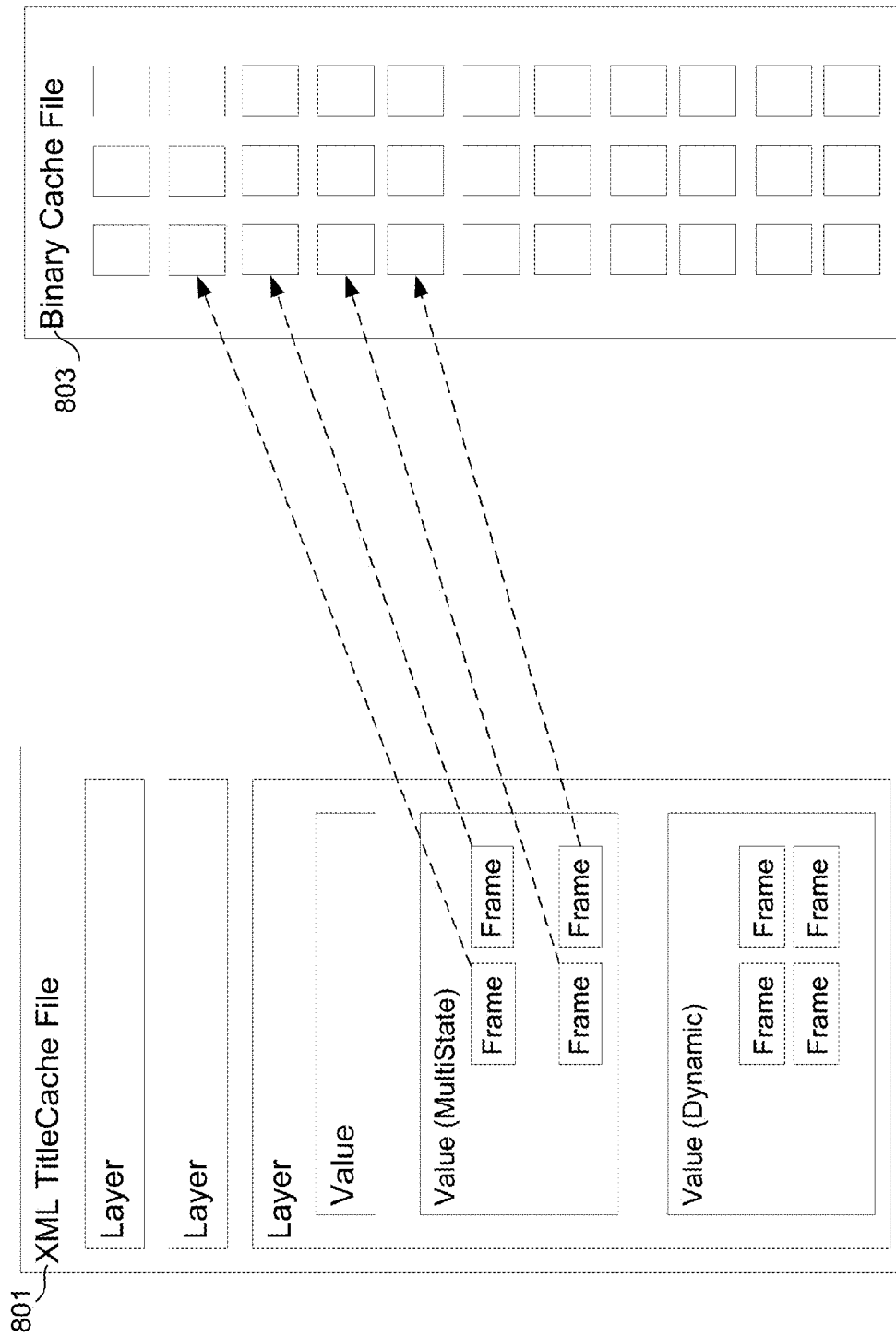
FIG. 8 illustrates a block diagram of a file representation of an XML TitleCache definition, according to an embodiment.

FIG. 8 illustrates a block diagram of a file representation of an XML TitleCache definition 801, according to an embodiment. When the title first loads, it sends the TitleCache 705 the cache file to load. The entire cache is placed in one binary cache file 803, though there may be a separate XML definition 801 that controls the parsing of the data. In some embodiments, the definition data may be stored in an alternate format from XML. In other embodiments, it may be included in the binary cache file. In some embodiments, the one binary cache file 803 may be compressed to reduce storage requirements and enhance efficiency of the overall system 200.

It also may be memory mapped, to improve performance. If compressed and the compression is fast, then the compressed format might also be the format that is kept in memory, when loaded, and then uncompressed prior to rendering.

In another instance, when the title is new or gets a new template, it may notify the Title Cache to refresh itself. This regenerates the renders and saves to cache, as needed.

Accordingly, when the title is saved, it gets the cache file XML data 701 from the Title Cache.

Figure 9:
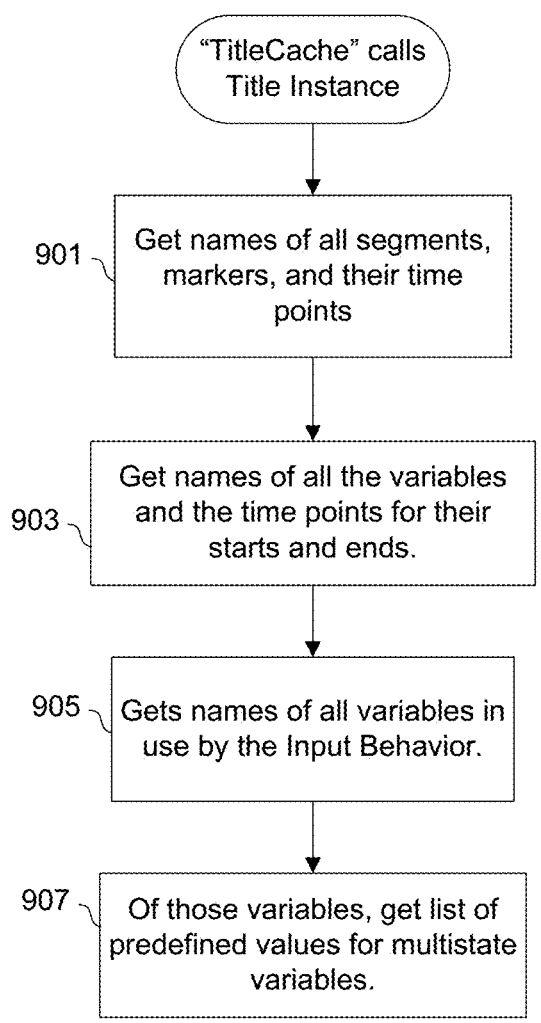
FIG. 9 illustrates a flowchart of building a representation of the title of the cache system, according to an embodiment.

Next, to properly build a representation of the title, "TitleCache" calls the Title Instance. FIG. 9 illustrates a flowchart of building a representation of the title of system 200 which is also provided in the steps below.
1. Get the names of all the segments, markers, and their time points (901).
2. Get the names of all the variables and the time points for their starts and ends (903).
3. Gets the names of all the variables in use by the Input Behavior (905).
4. Of those variables, get the list of predefined values for multistate variables (907).

Scheduler:

Referring again to FIG. 7, the Scheduler 205 may be used to manage the primary access to the TitleCache. All internal and external calls to control playback route through the Scheduler 205.

In some instances, the Scheduler 205 maintains a central list of all TitleCaches 703 and then parses incoming commands and sends them to the appropriate TitleCache instance 703. The Scheduler 211 may also manage access to the output of the TitleCaches 703, so that the output device 211 can simply call the Scheduler 205 to retrieve the rendered frames.

During playback, the Scheduler 205 manages queuing and then forwarding Schedule requests to the TitleCache to control playback.

Render Engine:

Referring again to FIG. 7, the Render Engine 209 operates outside the title cache, since it can be a completely external technology, and so requests to it are made asynchronously. To accommodate this, a queue of render requests is managed. The Render Engine 209 calls the TitleCache, from its own thread, and retrieves these requests, runs the renders, and then calls back with the rendered frames.

A specialized class handling called CCacheRenderRequest, representing a render request, is a block of frames that are to be rendered for a particular set of variable values of the time segment for the frames.

In some instances, the render engine generates all calls to TitleCache. These calls are thread safe and return quickly. With each frame rendered, the render engine may generate a call back to the TitleCache to pass the frame to it and determine whether to continue or switch to a different render. In another embodiment, the title cache generates calls to the render engine to render the frame sequences.

Figure 10:
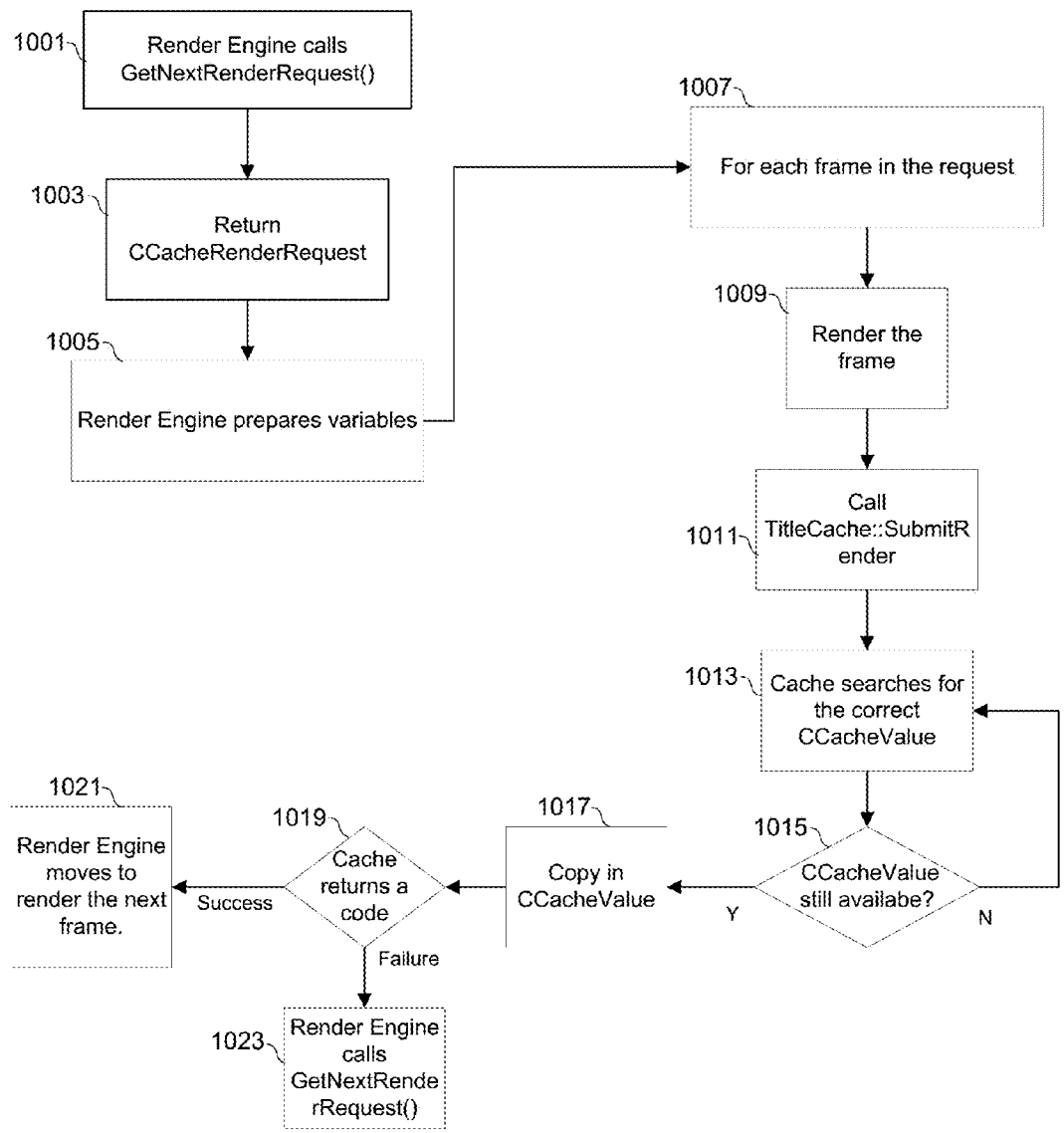
FIG. 10 illustrates a flowchart of the frame rendering by the render engine of the title cache system, according to an embodiment.

FIG. 10 illustrates a flowchart of the frame rendering by the render engine of the title cache system 200 which is also provided in the steps below.
1, Render Engine calls GetNextRenderRequest( ) (1001) which returns CCacheRenderRequest (1003).
2. Render Engine prepares the variables (1005).
3. Then, for each frame in the request (1007),
   a. Render the frame (1009).
   b. Call TitleCache::SubmitRender (passing it both the Frame and the CCacheRenderRequest) (1011).
   c. Cache searches for the correct CCacheValue and, if it is still there, sends it the frame (1015), which CCacheValue copies in (1017).
   d. Cache returns a success code to continue or a failure code if this is no longer needed. Failure can also mean the render is finished (1019).
   e. If success, Render Engine moves to render the next frame (1021).
   f. If failure, Render Engine calls GetNextRenderRequest( )(1023).

Note that the Render Engine retains the one instance of CCacheRenderRequest, returning the one instance when done via ReturnRenderRequest( ). In some situations, this typically frees the memory. But, this also provides a way for the title cache to stop a render and then continue at a later time. It also provides a way for the Render Engine to return a render that it has not completed, because the Render Engine needs to work on something else that may have higher priority. However, there can be other equally acceptable ways to organize the queue of render requests between the title cache and the Render Engine.

Output Devices:

Finally, the Output Devices 211 component, as shown in FIG. 7, calls TitleCache::GetFrame( ) when Output Devices 211 requires a frame. In some instances, the TitleCache may always return the frame immediately. In other aspects, if the TitleCache does not have the frame ready, TitleCache may return the previous frame, remaining active and uninterrupted.

The TitleCache may use a memory cache of two or more CCacheFrameBuffers to ensure that TitleCache is ready to play. A lower priority thread may run in the background, ensuring these are replenished.

The CCacheFrameQueue may generate and store a short queue of fully composited frames for playback. The intention is to make sure that there is always a frame ready to go so the output is uninterrupted.

In some embodiments, there are three external objects that generally drives the framebuffer:

The output. These include the output devices through which the frames stream. It is constantly asking for a new frame.

The parent cache. Under the control of the scheduler, this is frequently changing the status, from updating variables to entering and leaving playback.

The refresh thread. This is a background thread that repeatedly calls all of the frame buffers to refresh their frames.

In other embodiments, there may be three modes of activity: Off, Play, and Paused.

Off: the title isn't even active. Any requests for a frame for output should get back a blank frame. Meanwhile, the buffer should be primed with the first frames for playback.

Paused: the titles are active, but not moving. Requests for frames always return the same frame, which is at the paused point in the title.

Play: the title is moving forward. Every time a frame is requested, the next in line is served and the background thread is actively replenishing the queue.

Note that the actual mode is determined by the activity of the title. For example, as soon as something is scheduled to play, the play state becomes Play. The actual mode remains in that state until the last layer is finished sending out frames. Once all layers are stopped, the mode enters with Paused or Off state. The Off state is the special case where all layers have completed playing and entered the off state. The Paused state is the case where one or more layers still have the cursor, but are not moving.

CCacheRenderRequest represents a block of frames that is required to be rendered for a CCacheValue. This object is sent to the render engine, giving it a fully self-contained description of what is required.

Cache Rendering Optimization:

From the above discussion, a summary of attributes for defining and optimizing the cache rendering process in system 200 is provided below:

A variable is nothing more than a string of characters, i.e., an array of byte characters that specifies a specific graphic (i.e. text or image, etc.) to show over a range of time.

The data input 203 defines which variables it sends and what values it puts in them.

The Title Template 235 defines which variables it supports and, for each, how it may translate the incoming string into the appropriate image to render.

The TitleCache 601 takes the set of variable value strings from the data input 203 and sends them to the Render Engine 209 to render an image, using the title template 235 to define the render.

Later for playback, the TitleCache 601 matches live data strings from the data input 203 with its cached images and copies it into the frame.

In yet another example of the caching system 200 applied to a sporting event scenario, the data input source 201 may be a sports score controller, sending a numeric value to indicate a game quarter. Depending on its layout and intended usage, the title design might have several choices for how it displays the first quarter:

1 (text string of "1")

1st (text string of "1st" where the ST are a much smaller font size)

First Quarter (translated into a completely different text string)

[image] (an image that shows the quarter status.)

In all cases, the representation of the original string is defined by the title design and the cache should not be involved. Instead, title design should request a render of "1" and return whatever interpretation the design has for what first quarter should look like. And, as with the previous clock timer example, it may be constraining for the cache to interpret how large or small the rendered image will be or where it should be placed.

Data Independent Rendering

For the game quarter case, the cache may represent all values for all variables as simply text strings, with no comprehension as to their meaning. And so, it is agnostic as to the meaning of any string passed to it by an input source. It simply passes it to the rendering engine, along with the selected template.

The title template may incorporate a translation table, equating specific input strings with specific values to render an image. This allows one configuration to convert a "1" into a simple displayed string, while another configuration to convert it into an image.

With that in mind, the steps for preparing the cached image of the value "1" for variable "quarter" include:

1. The input sends the text string "1" for the variable "quarter"
2. The cache simply passes it to the title template and requests it to render "1".
3. The render engine consults the translation table in the title template, which converts the "1" into the appropriate rendered text or image.
4. The render engine sends back the rendered image.
5. The cache stores the rendered image, with optional optimizations of compression and calculating and storing just the ROI.
6. On playback, the input sends "1"
7. The cache selects the image for "1" and builds the full image by layering this image on top of the remainder of the scoreboard components.

For the game clock scenario, the title cache is also unaware of what it is displaying, similar to the game quarter case. In the game clock case, additional items are considered. For example, if a rendering of every variation of the clock is created, 10,000 frames are potentially created for all the combinations of values in a four-digit clock. In this situation, the cache system 200 may subdivide the problem and address each digit independently. Then, the title cache system 200 may prepare only a smaller portion of different variations, (e.g., 10 variations), one for each numeric value. However, because the title cache does not know how these are drawn or what they really represent, the title cache does not have the ability to reuse the same digit in all four positions.

To address this limitation of the title cache, and still keep the title cache completely independent of the data, a Multipart Variable caching is introduced as another component of the system 200. In one instance, the multipart variable caching may break a string into several sub-segments and create a set of variation renders for each string. Then, on playback, the Multipart Variable caching may select the variations that together match the requested input and merge them into one image. For Multipart Variables, a. The Input can specify a variable as composed of individual letters, or related sets of one or more letters, as long as they combine to match all possible input patterns.

b. The Input specifies all values for each letter (or set), so that each digit can be independently rendered.
c. The Input may provide a format string that is used to set the spacing of the letters during rendering.
d. Each letter (or set) is rendered separately with its own time sequence.
e. When an individual letter (or set) changes, it can play out and then the replacement plays in.
f. If a letter (or set) does not change, it remains unchanged at the pause point.
g.

Figure 11:
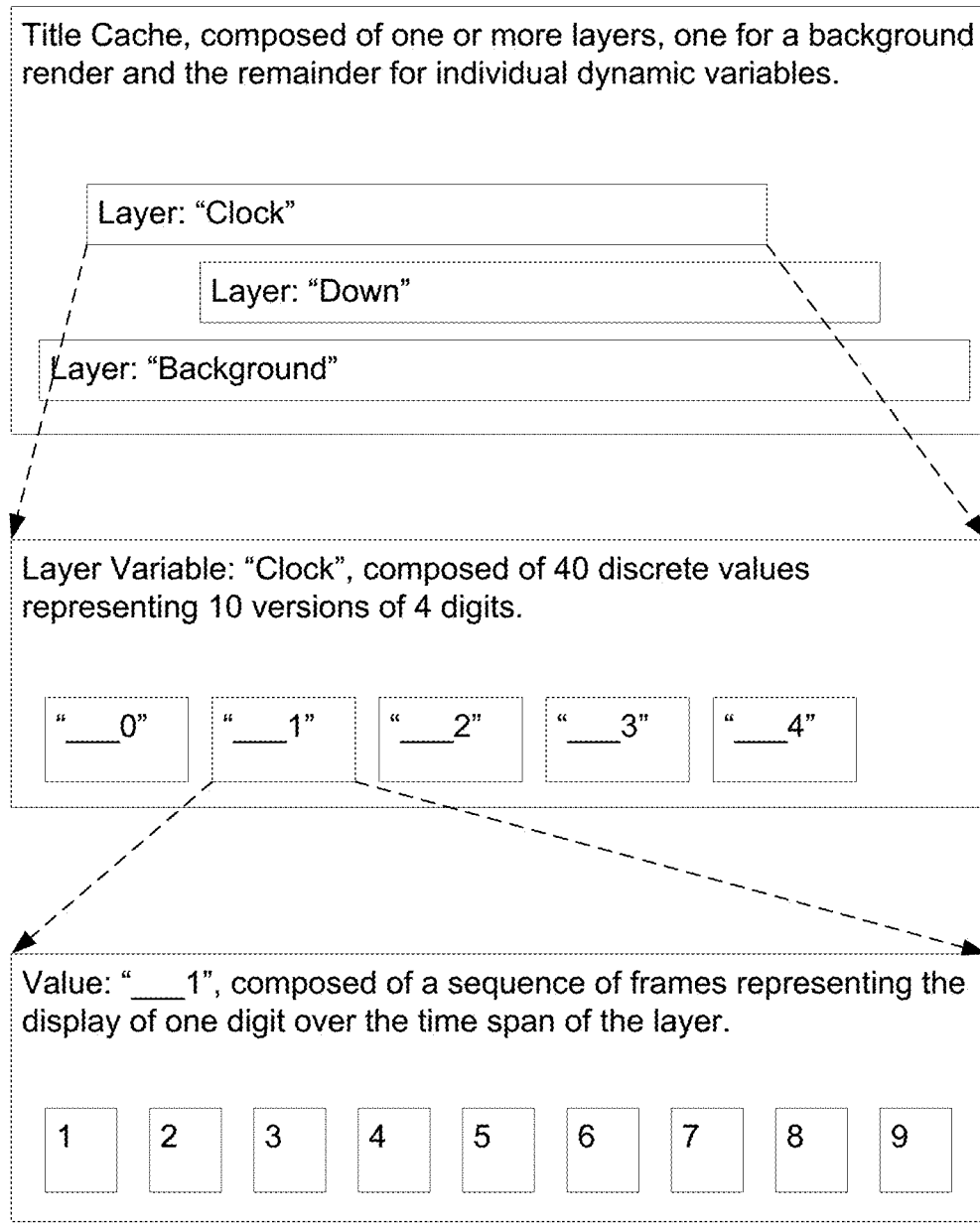
FIG. 11 illustrates a block diagram of a Multipart Variable, according to an embodiment.

FIG. 11 illustrates a block diagram of the Multipart Variable named "Clock", according to an implementation. In the game clock example,
1. When building the cache:
   a. Break the string down into separate segments. (i.e. the clock digits)
   b. For each segment, provide all possible value variations.
   c. Render each variation for each segment.
   d. Represent each variation as the full string but with empty spaces for the parts outside the segment. (i.e., —"1_____", "2_____", all the way up to "_____1", "_____2")
   e. Store each of these variations as the partial string and its associated image.
2. On playback, in response to a text value from the input:
   a. Search through the list of variations.
   b. For each variation that provides characters that match exactly in value and position the input value:
      i. Select the variation.
      ii. Remove the matching characters from the search.
      iii. Continue until all characters are matched.
   c. Create a composite by adding all of the selected variation images together into one image.

In the cache system 200, the process may construct a composite of images to correctly represent the string that is passed by layering together all variations, using the matching of substrings to recreate the set of sub-images that build the equivalent image. The solution presented so far only works if the size of each digit is exactly the same. For example, draw the time string "12:34" in a proportional font, then draw just the last digit with the string "4" results in string placement errors. To overcome this placement error, the optional concept of a format string is applied to the system 200. The format string may provide an interpretation of the render that should be used to determine a positioning of each segment during render. Such positioning adjustment is referred to in this document as a Multipart Alignment.

In one instance of the Multipart Alignment, the format string may be simply a string with all characters filled in that shows an appropriately spaced rendering. For example, with the clock format, it could be "00:00".

To implement the Multipart Alignment in system 200:
1. For each render, include both the substring, i.e., "4", and the format string, i.e., "00:00".
2. The render operation first organizes the spacing of the proportional characters for "00:00".
3. Then the render replaces the letters of the format with the letters of the substring.
4. It then renders with the letters in these positions.
5. The '4' is placed exactly in the position of the 4th '0' from the format, as it should be.

FIG. 12 illustrates a display output of the current time in an international city. Here, two variables are defined: City and Time. The City is simply a string from the input with the name. This is updated very infrequently, so it is not pre-cached. Because the Time is constantly changing, it may be required to pre-cache its values in order to be able to call them up and display them immediately. Between six digits and the colon pattern, ": :", the input specifies 61 unique variations which can be combined to build all permutations. These unique variations are all rendered and saved in the cache. Subsequently, during playback, the unique variations may be used by a multi-cache to assemble full composited images, as shown here for the string "17:31:57".

Figure 13:
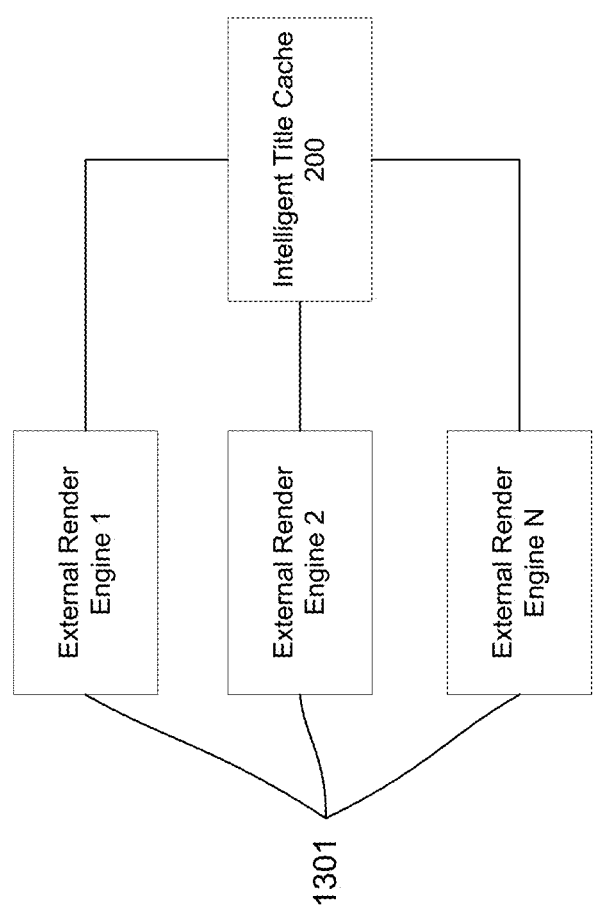
FIG. 13 illustrates a block diagram of the intelligent title cache system and external render engines, according to an embodiment.

FIG. 13 illustrates a block diagram of the intelligent title cache system 200 and external render engines, according to another embodiment. The intelligent title cache system 200 may be coupled with one or more external render engines 1301 and configured to control the selective layer by layer rendering of variable data in the rendering engines, so as to build the necessary frame cache. These external render engines 1300 may include, for example, third party software or hardware visual effect or animation tools.

Figure 14:
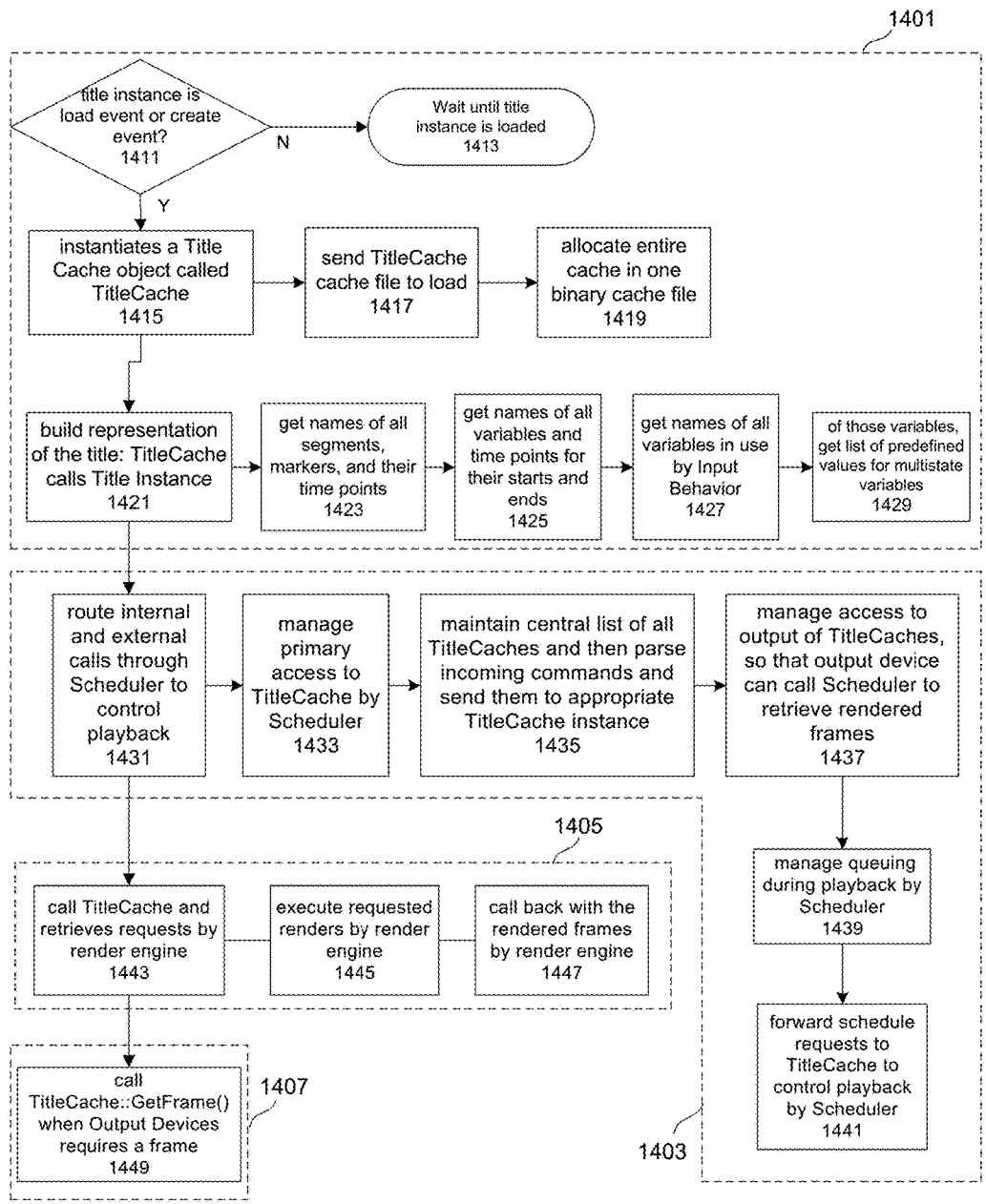
FIG. 14 illustrates a flowchart of the intelligent title cache system, according to an embodiment.

FIG. 14 illustrates a flowchart of the intelligent title cache system 200. A process flow of the intelligent title cache system 200 may be sub-divided into four operational groups as indicated by dotted lines in FIG. 14. These include, for example, a TitleInstanceManager group 1401, a Scheduler group 1403, a Render Engine group 1405, and Output Devices group 1407. Each of the four operational groups represents the process flow operation of their corresponding components. For example, the TitleInstanceManager group 1401 represents the process flow for the TitleInstanceManager 701, the Scheduler group 1403 represents the process flow for the Scheduler 205, the Render Engine group 1405 represents the process flow for the Render Engine 209, and the Output Devices group 1407 represents the process flow for the Output Devices 211 as shown in FIG. 7. Starting at 1411, the system 200 checks when an event at a title instance is a load event or create event. If no title instance is present at step 1411, the TitleInstanceManager 701 waits (step 1413) until one becomes available. When a valid title instance is loaded or created, the TitleInstanceManager 701 instantiates a Title Cache object called TitleCache (step 1415) which sends the TitleCache cache file (step 1417) to load and allocates the entire cache in one binary cache file (step 1419). Note, at this stage and prior to steps 1421-1429, the cache structure is not yet known because the content may not yet exist as to what to store in the cache structure. Once the TitleCache connects to the input, then it may differentiate which input variables to separate out into the cache, and what values to send to the cache. After instantiating the Title Cache, the TitleInstanceManager 701 assembles a representation of the title: TitleCache calls Title Instance (step 1421) which includes, for example, acquiring names of all segments, markers, and their time points (step 1423), acquiring names of all variables and time points for their starts and ends (step 1425), getting names of all variables in use by Input Behavior (step 1427), and of those variables, getting a list of predefined values for the multistate variables (step 1429). In the Scheduler group 1403, the Scheduler 205 is configured to manage primary access to the TitleCache, including, for example, routing all internal and external calls through the Scheduler to control playback (step 1431), managing primary access to TitleCache (step 1433), maintain central list of all TitleCaches and then parsing incoming commands and then sending them to appropriate TitleCache instance (step 1435), managing access to output of TitleCaches, so that output device can call the Scheduler to retrieve rendered frames (step 1437), managing queuing during playback (step 1439), and forwarding schedule requests to TitleCache to control playback (step 1441). In the Render Engine group 1405, the Render Engine 209 is configured to perform all 3D rendering operations in the system 200, including, for example, calling TitleCache and retrieving rendering requests (step 1443), executing requested renders (step 1445), and calling back with the rendered frames (step 1447). Finally, in the Output Devices group 1407, the Output Device 211 is configured to retrieve and stream multiple frames which is managed and made accessible by the Scheduler 211. For example, after frames are fully rendered by the Render Engine 209, the Output Devices 211 may call TitleCache::GetFrame( ) when the Output Devices 211 requires a frame (step 1449).

Several features, attributes, and benefits of the system 200 are summarized below:
- A Title is composed of a template and a number of variables in the template.
- Input determines which variables are dynamic.
- Dynamic variables are each rendered in their own layer.
- All other variables are set once and rendered in a background layer.
- Dynamic variables can play in sync with the rest of the title, or independently.
  - Playback of the title is from the start to a pause point, and then to the end.
  - Dynamic variables may start, pause, and stop payback independently.
  - Start and stop times for dynamic variables may optionally be the actual start and stop times of the variables themselves within the template.
  - Playback of a variable considers its relation to the pause point. For example:
    - To change a visible value, play from pause to out (end point of variable in the time line), then insert new value and play from in (start point of the variable in the time line) to the pause point.
    - To momentarily view the value, play from in to out, without stopping.
- Input can specify a set of expected values for a variable, so they can be precomputed and cached.
  - When variables are not cached, playback request waits for the new value to render, then plays it.
    - The playback includes options for waiting for render, waiting to sync several parallel variable renders, playing without waiting, playing part way through, etc.
- Multipart variables
  - Input can specify a variable as composed of individual variable subsets such as individual alphanumeric letters or subsets of letters.
  - Input specifies all values for each letter/subset, so that each letter/subset can be independently rendered.
  - Input may provide a format string that is used to set the spacing of the letters during rendering.
  - Each letter/subset is rendered separately with its own time sequence.
  - When an individual letter/subset changes, it can play out and then the replacement plays in.
  - If a letter/subset does not change, it remains unchanged at the pause point.

Benefits and Advantages of system 200
- Data independent rendering.
  - Highly efficient playback driven by intelligent understanding of the component data and recognition that full render of a complex scene is much more compute intensive than overlaying precomputed bitmaps.
  - Isolate different data (variables) into their own layers.
    - Things that never change are rendered once and stored.
    - Things that have all values known before also rendered once and stored.
    - Complicated multiple part data, such as time clocks, broken into parts and pre-rendered.
    - Things that are truly dynamic are rendered on the fly
      - Typically just a short text sequence—simple and fast.
        - Automatic—system inserts the render prior to play.
        - Deliberate—requests the render then follows with play.
    - Supports complex, multiple asynchronous animations as easily as a still image.
      - Render is simply a look up of each variable image at its point in its sequence.
  - By offloading the 3D graphics (or other render technology) engine, it is possible to run this on a wide range of computers, from simple processors with onboard graphics software to powerful GPU systems.
  - Playback is almost always the same. (Exception is insertion of updated variable value.)
  - Preparation/pre-render will take longer on slower machines.

All patents, patent applications, and other references cited herein are incorporated by reference in their entireties.

What has been described and illustrated herein is a preferred embodiment in this document along with some of its variations. The terms, descriptions and figures used herein are set forth by way of illustration only and are not meant as limitations. Those skilled in the art will recognize that many variations are possible within the spirit and scope of the embodiments in which all terms are meant in their broadest, reasonable sense unless otherwise indicated. Any headings utilized within the description are for convenience only and have no legal or limiting effect.

Other embodiments and modifications of the present document may occur to those of ordinary skill in the art in view of these teachings. Accordingly, the embodiments in this document are to be limited only by the following claims which include all other such embodiments and modifications when viewed in conjunction with the above specifications and accompanying drawings.

What is claimed is:

1. In a title cache system for managing a title having a template and a plurality of variables associated with the template, a method comprising:
   instantiating a title cache object by a title instance manager in response to a title instance event, wherein the title instance event includes a load event and a create event;
   managing access to the title cache object, including routing a plurality of internal calls and external calls through a scheduler to control a playback of a plurality of frames;
   rendering the plurality of frames into a series of rendered frames by a render engine, wherein the title cache system is bidirectionally communicatively coupled to an external render engine and is configured to manage the external render engine, where the external render engine is a third party software or a hardware visual and multi-layer animation tool that loads an authored project information of a completed file in its own format and provides the authored project information to the title cache system about the organization of its internal layers, and the title cache system can then control the external render engine to deliver to it a selective layer by layer rendering of graphics data; and retrieving the plurality of frames by one or more output devices for streaming the playback, wherein the scheduler is configured to manage a queuing during the playback and configured to forward a plurality of schedule requests to the title cache object to control the playback.

2. The method of claim 1, wherein the title instance manager is configured to transmit to the title cache object a cache file to load in response to the load event, wherein the cache file is allocated to a binary file.

3. The method of claim 1, wherein the title instance manager is configured to determine which of the plurality of variables associated with the template are a plurality of dynamic variables and which of the plurality of variables associated with the template are a plurality of regular variables based on a data input.

4. The method of claim 3, wherein each of the plurality of dynamic variables are rendered in a dynamic layer.

5. The method of claim 3, wherein each of the plurality of regular variables are rendered in a background layer.

6. The method of claim 3, wherein the plurality of dynamic variables are configured to play in sync with the title or play asynchronously.

7. The method of claim 1, wherein the playback is configured to wait for the series of rendered frames, wait to synchronize to a plurality of parallel variable rendered frames, play without waiting for the series of rendered frames to complete rendering on the render engine, and play a portion of the series of rendered frames.

8. The method of claim 1, wherein the title cache object includes a multipart variable caching component and an input associated with the multipart variable caching component.

9. The method of claim 8, wherein the input associated with the multipart variable caching component indicates a plurality of individual variable subsets.

10. The method of claim 9, wherein each of the plurality of individual variable subsets is rendered separately having a unique time sequence.

11. A title cache system for managing a title having a template and a plurality of variables associated with the template, the system comprising:

a title instance manager configured to instantiate a title cache object in response to a title instance event, wherein the title instance event includes a load event and a create event;

a scheduler configured to manage access to the title cache object, including routing a plurality of internal calls and external calls through the scheduler to control a playback of a plurality of frames;

a render engine configured to render the playback of a plurality of frames into a series of rendered frames, wherein the title cache system is bidirectionally communicatively coupled to an external render engine and is configured to manage the external render engine, where the external render engine is a third party software or a hardware visual and multi-layer animation tool that loads an authored project information of a completed file in its own format and provides the authored project information to the title cache system about the organization of its internal layers, and the title cache system can then control the external render engine to deliver to it a selective layer by layer rendering of graphics data; and one or more output devices configured to retrieve the plurality of frames for streaming the playback.

12. The system of claim 11, wherein the title instance manager is configured to transmit to the title cache object a cache file to load in response to the load event, wherein the cache file is allocated to a binary file.

13. The system of claim 11, wherein the title instance manager is configured to determine which of the plurality of variables associated with the template are a plurality of dynamic variables and which of the plurality of variables associated with the template are a plurality of regular variables based on a data input.

14. The system of claim 13, wherein each of the plurality of dynamic variables are rendered in a dynamic layer.

15. The system of claim 13, wherein each of the plurality of regular variables are rendered in a background layer.

16. The system of claim 13, wherein the plurality of dynamic variables are configured to play in sync with the title or play asynchronously.

17. The system of claim 11, wherein the playback is configured to wait for the series of rendered frames, wait to synchronize to a plurality of parallel variable rendered frames, play without waiting for the series of rendered frames to complete rendering on the render engine, and play a portion of the series of rendered frames.

18. The system of claim 11, wherein the title cache object includes a multipart variable caching component and an input associated with the multipart variable caching component.

19. The system of claim 18, wherein the input associated with the multipart variable caching component indicates a plurality of individual variable subsets.

20. The system of claim 19, wherein each of the plurality of individual variable subsets are rendered separately having a unique time sequence.

* * * * *